United States Patent
Fujiwara et al.

[11] Patent Number: 5,886,592
[45] Date of Patent: Mar. 23, 1999

[54] FEEDTHROUGH CERAMIC CAPACITOR HAVING A GROUNDING FITTING FOR FRICTIONALLY FIXING THE CAPACITOR TO A CAPACITOR SUPPORT

[75] Inventors: Isao Fujiwara; Setsuo Sasaki, both of Akita, Japan

[73] Assignee: TDK Corporation, Tokyo, Japan

[21] Appl. No.: 925,473

[22] Filed: Sep. 8, 1997

[30] Foreign Application Priority Data

Sep. 18, 1996 [JP] Japan ................................. 8-245985

[51] Int. Cl.⁶ ........................... H01G 4/42; H01J 23/15
[52] U.S. Cl. ..................... 333/182; 333/185; 315/39.51; 361/302
[58] Field of Search ............................ 315/39.51, 39.53; 333/182–185, 181; 361/302

[56] References Cited

U.S. PATENT DOCUMENTS

| | | | |
|---|---|---|---|
| 4,752,720 | 6/1988 | Oguro et al. ..................... | 333/182 X |
| 4,900,985 | 2/1990 | Tashiro et al. .................... | 315/39.51 |
| 5,313,139 | 5/1994 | Yoon ................................ | 315/39.51 |
| 5,544,002 | 8/1996 | Iwaya et al. ...................... | 361/302 |

FOREIGN PATENT DOCUMENTS

| | | | |
|---|---|---|---|
| 0 259 766 | 3/1988 | European Pat. Off. . | |
| 61-93533 | 5/1986 | Japan ............................... | 315/39.51 |
| 62-88244 | 4/1987 | Japan ............................... | 315/39.51 |
| 63-3149 | 1/1988 | Japan . | |
| 63-221536 | 9/1988 | Japan ............................... | 315/39.51 |
| 4-78744 | 7/1992 | Japan . | |
| 4-82138 | 3/1992 | Japan ............................... | 315/39.51 |
| 2 061 618 | 5/1981 | United Kingdom . | |

*Primary Examiner*—Seungsook Ham
*Attorney, Agent, or Firm*—Oblon, Spivak, McClelland, Maier & Neustadt, P.C.

[57] ABSTRACT

A feedthrough ceramic capacitor having a grounding fitting provided in a part of a housing of the capacitor is mounted to a filter box by being forced into the latter through an insertion hole of the filter box. Since a corrugated edge is provided around the entire circumference of the insertion hole provided in the filter box, the feedthrough ceramic capacitor can be forced into the filter box easily. Further, because no gap is generated between the filter box and the grounding fitting, high-frequency noise in the inside of the filter box never leaks to the outside.

8 Claims, 4 Drawing Sheets

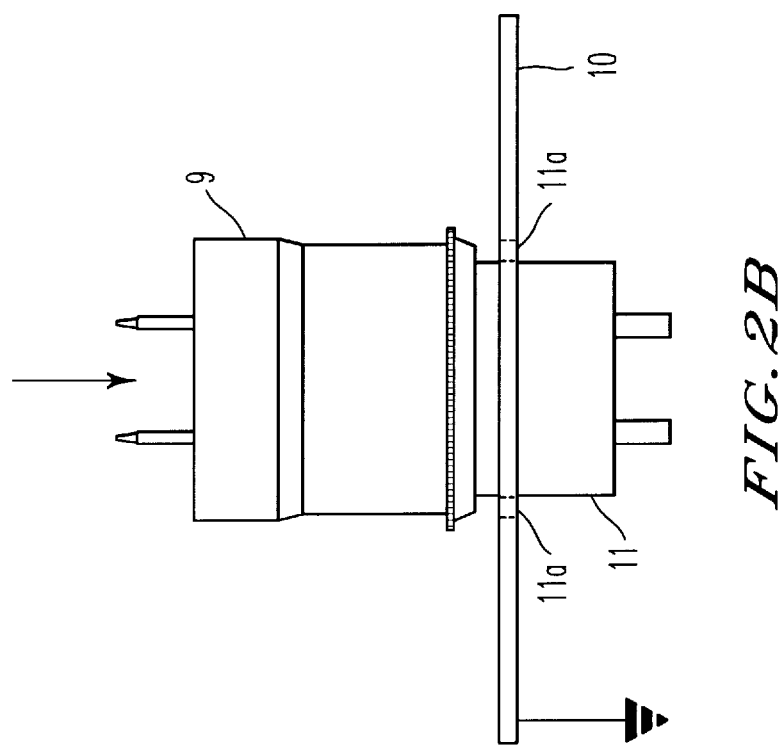
FIG. 2B
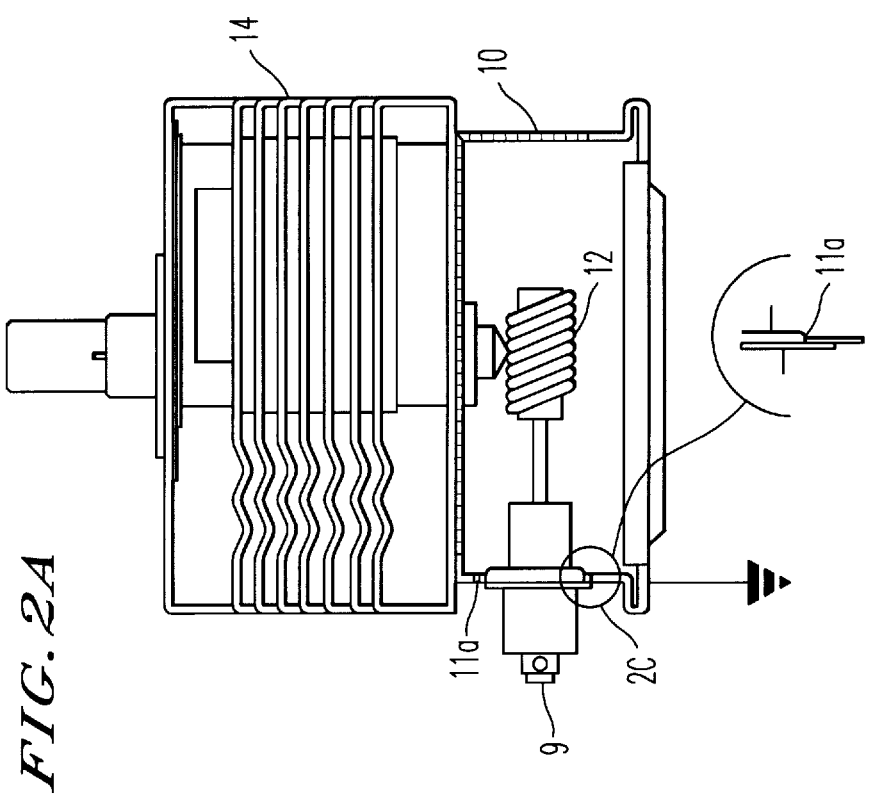
FIG. 2A
FIG. 2C

FEEDTHROUGH CERAMIC CAPACITOR HAVING A GROUNDING FITTING FOR FRICTIONALLY FIXING THE CAPACITOR TO A CAPACITOR SUPPORT

BACKGROUND OF THE INVENTION

1. Field of the Invention

The present invention relates to a feedthrough ceramic capacitor and a support for fixing the feedthrough ceramic capacitor.

2. Description of the Related Art

Feedthrough ceramic capacitors are generally used in LC composite part devices used as filters.

High-voltage LC composite part devices uses feedthrough ceramic capacitors as line filters for oscillators using magnetrons used in high-frequency large-power apparatuses such as microwave ovens, or the like. Such high-voltage LC composite part devices are taken notice as a social problem because noise pollution is caused by electromagnetic wave leaked out of those devices. To prevent such noise pollution, various kinds of line filters have been heretofore proposed.

FIG. 4A shows the configuration of a conventional feedthrough ceramic capacitor used as the aforementioned line filter.

In the conventional feedthrough ceramic capacitor 59, two through-holes are formed at a certain interval therebetween in a piece of dielectric porcelain 52 constituting a capacitor. The dielectric porcelain 52 has individual electrodes 51b provided on its one surface independently of each other, and a common electrode 51a provided on its other surface. Feedthrough conductors 53a and 53b pass through the through-holes. The independent electrodes 51b are connected to the feedthrough conductors 53a and 53b, respectively, through connection fittings 61, or the like, by soldering, or the like. Further, the feedthrough conductors 53a and 53b are covered with electrically insulating tubes 54 so as to be kept electrically insulated from the common electrode 51a. These main portions constituting a feedthrough ceramic capacitor are put in housing parts 57 and 58 and fixed by resins 55 and 56.

Here, the common electrode 51a is connected to a grounding fitting 60 and the grounding fitting 60 is led to the outside directly so as to be exposed to the outside of the housing.

When the conventional feedthrough ceramic capacitor 59 having the aforementioned configuration is to be used as a high-voltage LC composite part device for preventing noise of a magnetron, or the like, as shown in FIG. 4B, the feedthrough ceramic capacitor 59 is inserted into an insertion hole 62 of a metal support 63 such as a filter box fixed to the magnetron so that the grounding fitting 60 of the feedthrough ceramic capacitor 59 and the metal support 63 are fixed to each other by screws 58, eyelet caulking, or the like, by using through-holes 64a formed in the four corners of the grounding fitting 60 and through-holes 64b formed in the support 63.

Then, the feedthrough ceramic capacitor 59 and an inductor are connected to each other in the inside of the metal support 63. Thus, the LC composite part device which is a line filter used for preventing noise of the magnetron, or the like, is formed.

A feedthrough ceramic capacitor is generally mounted to a filter box which is a metal support having the ground potential (hereinafter referred to as "filter box"). Here, the feedthrough ceramic capacitor used in a high-frequency large-power apparatus using a magnetron which is apt to cause a problem of high-frequency noise is fixed to the filter box by screws, eyelet caulking, or the like.

Such a fixing work, however, must be performed by hand thoroughly, so that the workability is poor.

Further, in the fixture method in which the feedthrough ceramic capacitor is fixed to the support by using four holes formed in the grounding fitting of the feedthrough ceramic capacitor, adhesion is poor so that high-frequency noise generated by the high-frequency apparatus may leak to the outside through a gap in the contact surface between the grounding fitting and a side plate of the filter box.

SUMMARY OF THE INVENTION

It is an object of the present invention to provide a feedthrough ceramic capacitor which can be fixed to a filter box easily and which is less in leakage of high-frequency noise, and a method of mounting such a feedthrough ceramic capacitor to the filter box.

A feedthrough ceramic capacitor according to the present invention is comprised of: at least one capacitor having a plurality of electrodes; a grounding fitting connected to one of the electrodes of the capacitor; at least one feedthrough conductor connected to the other electrode of the capacitor and passed through the capacitor; a connection fitting connected to the feedthrough conductor; and an electrically insulating housing; wherein the grounding fitting is exposed to an outside of the electrically insulating housing, and a part of the exposed portion of the grounding fitting is parallel to a surface of the electrically insulating housing.

A feedthrough ceramic capacitor keeping support according to the present invention is comprised of: a metal support having an insertion hole for inserting a feedthrough ceramic capacitor therein, a corrugated edge being provided around an entire circumference of the insertion hole; and a ground potential.

A feedthrough ceramic capacitor fixing method according to the present invention is comprised of: forcing the feedthrough ceramic capacitor into the insertion hole of the feedthrough ceramic capacitor keeping support; and keeping and fixing a grounding surface of the ground fitting of the feedthrough ceramic capacitor in a position where the grounding surface of the grounding fitting is brought into contact with the support.

An LC composite part device is comprised of: a feedthrough ceramic capacitor support, a feedthrough ceramic capacitor, and an inductor, wherein the feedthrough ceramic capacitor is forced into the support and fixed to the support.

By providing a feedthrough ceramic capacitor and a metal support according to the present invention, the feedthrough ceramic capacitor can be mounted to the metal support easily. Because the adhesion of the feedthrough ceramic capacitor to the metal support is high, a filter free from leakage of high-frequency noise can be provided.

BRIEF DESCRIPTION OF THE DRAWINGS

In the accompanying drawings:

FIG. 2A is a sectional view of a magnetron provided with an LC composite part device which is a line filter used for preventing noise;

FIG. 2B is a side view of the LC composite part device which is fixed to the magnetron;

FIG. 2C is an enlarged view of the corrugated edge 11a of the magnetron shown in FIG. 2A;

DETAILED DESCRIPTION OF THE INVENTION

Detailed description of the present invention will be described as follows.

Generally, in a feedthrough ceramic capacitor, one electrode of the capacitor is connected to a grounding fitting and the other electrode of the capacitor is connected to a feedthrough conductor. The capacitor is arranged between a signal transmission line and the ground potential, so that the capacitor operates as a filter for removing unnecessary radiation high-frequency noise generated by a high-frequency apparatus and sent onto a signal transmission line.

Accordingly, the feedthrough ceramic capacitor is inserted into a hole of a filter box so that the grounding fitting disposed in a part of the feedthrough ceramic capacitor is connected to the filter box, or the like, having the ground potential.

The ground surface of the ground fitting is so folded as to be substantially parallel to the surface of an insulation housing. Consequently, even if the ground surface of the ground fitting receives a stress applied perpendicularly with respect to the case of the feedthrough ceramic capacitor, the stress can be kept by the elastic force of the grounding fitting.

The feedthrough ceramic capacitor having the aforementioned configuration is forced into the filter box through the insertion hole provided in the filter box so that the feedthrough ceramic capacitor is mounted to the filter box. In this occasion, the grounding fitting is designed to have the ground potential because the feedthrough ceramic capacitor is mounted to the filter box so that the grounding surface of the grounding fitting is brought into contact with the cut edge of the insertion hole of the filter box. Accordingly, the feedthrough ceramic capacitor operates as a filter.

Accordingly, because the feedthrough ceramic capacitor can be easily mounted to the filter box by being forced into the filter box through the insertion hole of the filter box, the workability is improved greatly.

Further, by providing a corrugated edge around the entire circumference of the insertion hole provided in the filter box, the feedthrough ceramic capacitor can be forced into the filter box more easily.

Further, because feedthrough ceramic capacitor mount holes need not be provided in the grounding fitting and in the filter box so that there is no gap generated between the filter box and the grounding fitting, high-frequency noise in the inside of the filter box never leaks to the outside.

Embodiments of the feedthrough ceramic capacitor according to the present invention will be described below in detail with reference to the drawings.

Figure 1B:
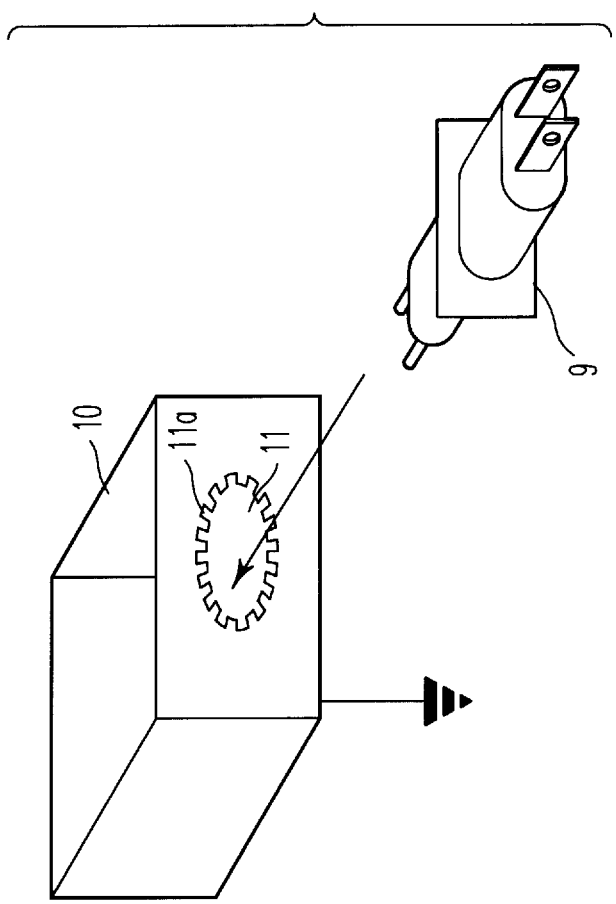
FIG. 1B is a conceptual view of the mounting of the feedthrough ceramic capacitor to a metal support.
Figure 1A:
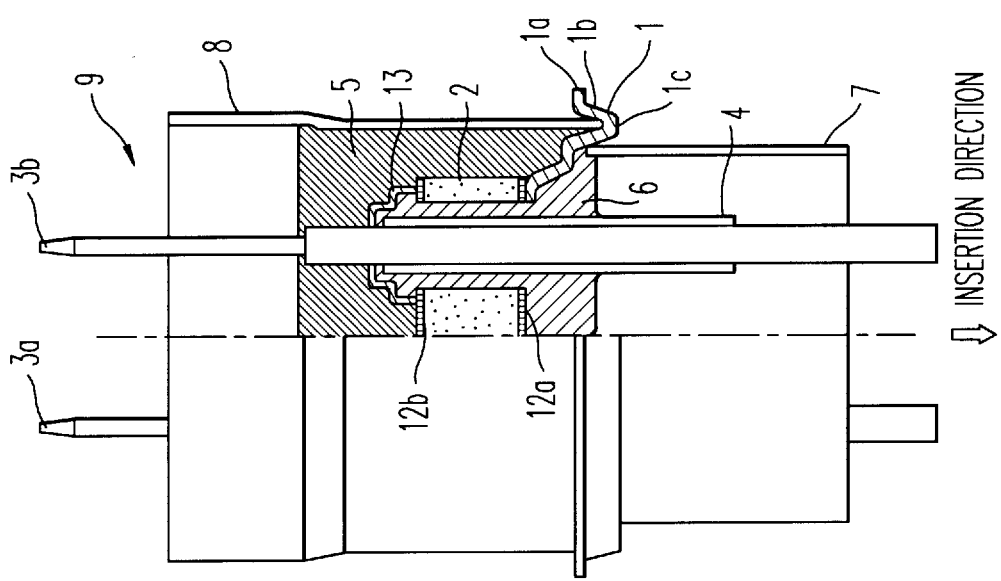
FIG. 1A is a partly sectional view of a feedthrough ceramic capacitor according to a first embodiment of the present invention.

FIG. 1A is a partly sectional view of a first embodiment of the feedthrough ceramic capacitor according to the present invention, and FIG. 1B is a conceptual view of mounting of the feedthrough ceramic capacitor to a filter box.

In the feedthrough ceramic capacitor 9 according to the present invention, two through-holes are formed at a certain interval therebetween in a piece of dielectric porcelain 2 constituting a capacitor. The dielectric porcelain 2 has individual electrodes 12b provided on its one surface independently of each other and a common electrode 12a provided on its other surface. Feedthrough conductors 3a and 3b pass through the through-holes. The independent electrodes 12b are connected to the feedthrough conductors 3a and 3b, respectively, through connection fittings 13 or the like by soldering or the like. Further, the feedthrough conductors 3a and 3b are covered with electrically insulating tubes 4 respectively so as to be kept electrically insulated from the common electrode 12a. These main portions constituting a feedthrough ceramic capacitor are put in housing parts 7 and 8 and fixed by resins 5 and 6.

Here, the common electrode 12a is connected to a grounding fitting 1 so as to be led to the outside and exposed to the outside of the housing. Here, the grounding fitting 1 is folded at a portion exposed to the outside of the housing so as to be substantially U-shaped (1c). That is, the grounding fitting 1 is folded so that the grounding surface of the grounding fitting 1 is substantially parallel to the surfaces of the housing parts 7 and 8 (1b), and the grounding fitting 1 is further folded so that the end portion of the grounding fitting 1 is perpendicular to the feedthrough conductors (1a).

Accordingly, when the feedthrough ceramic capacitor 9 according to the present invention is forced into an insertion hole 11 provided in a filter box 10 as shown in FIG. 1B, stress from the section of the insertion hole 11 is applied to the grounding fitting 1 and kept so that the grounding fitting and the section of the insertion hole are tightly fixed to each other.

Further, a corrugated edge 11a is provided around the entire circumference of the insertion hole so that the feedthrough ceramic capacitor can be forced into the insertion hole easily by slight force.

FIG. 2A shows an example of the feedthrough ceramic capacitor configured as a high-voltage LC composite part device for preventing noise of a magnetron.

When the feedthrough ceramic capacitor 9 is used as a high-voltage LC composite part device for preventing noise of a magnetron 14, the grounding fitting of the feedthrough ceramic capacitor 9 is forced into and fixed to the filter box 10 fixed to the magnetron 14 through the insertion hole 11 provided in the filter box 10 from the outside of the filter box 10 as shown in FIG. 2B to thereby prevent high-frequency noise generated by the magnetron 14 from leaking to the outside as extremely as possible.

The grounding fitting is folded so as to be substantially parallel to the housing surfaces of the feedthrough ceramic capacitor 9 and further folded so that the end portion of the grounding fitting is perpendicular to the feedthrough conductors. The folded portion at the end of the grounding fitting is brought into contact with a side surface of the filter box so that the grounding fitting is fixed to the filter box in the position where the grounding fitting comes in contact with the filter box. Further, because the corrugated edge 11a is provided around the insertion hole of the filter box 10, the corrugated edge is also bent inward as shown in FIG. 2C with the forcing of the feedthrough ceramic capacitor into the filter box 10. Accordingly, not only the feedthrough ceramic capacitor can be forced into the filter box easily by slight force but also the adhesion thereof is high.

Then, the feedthrough ceramic capacitor 9 is connected to an inductor 12 to thereby constitute the LC composite part device which is a line filter used for preventing noise of the magnetron.

Figure 3A:
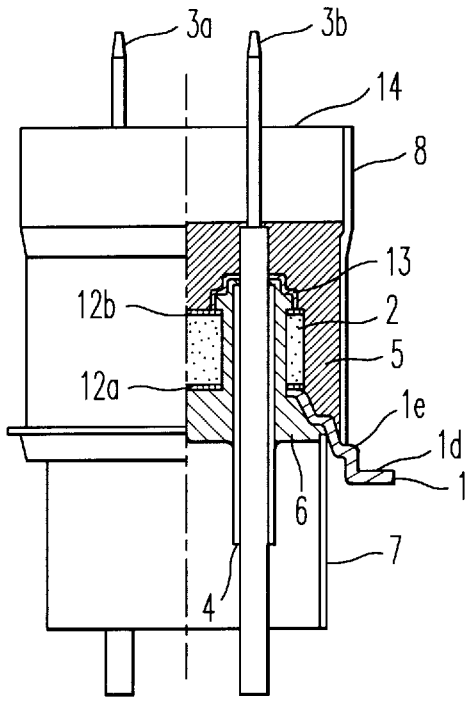
FIG. 3A is a partly sectional view of a feedthrough ceramic capacitor according to a second embodiment of the present invention.

Further, FIG. 3A shows a sectional view of a second embodiment of the feedthrough ceramic capacitor according to the present invention.

In the feedthrough ceramic capacitor 17, two through-holes are formed at a certain interval therebetween in a piece of dielectric porcelain 2 constituting a capacitor. The dielectric porcelain 2 has individual electrodes 12b provided on its one surface independently of each other, and a common electrode 12a provided on its other surface. Feedthrough conductors 3a and 3b pass through the through-holes. The independent electrodes 12b are fixed to the feedthrough conductors 3a and 3b, respectively, through connection fittings 13, or the like, by soldering, or the like. Further, the feedthrough conductors 3a and 3b are covered with electrically insulating tubes respectively so as to be kept electrically insulated from the common electrode 12a. These main portions constituting a feedthrough ceramic capacitor are put in housing parts 7 and 8 and fixed by resins 5 and 6.

The common electrode 12a is connected to a grounding fitting 1 so as to be led to the outside directly. The grounding fitting 1 is bent perpendicularly at a point exposed to the outside of the housing (1e) so as to be substantially parallel the surface of the housing part 8, and the grounding fitting 1 is further folded so that the end portion of the grounding fitting 1 is perpendicular to the feedthrough conductors (1d).

Figure 3B:
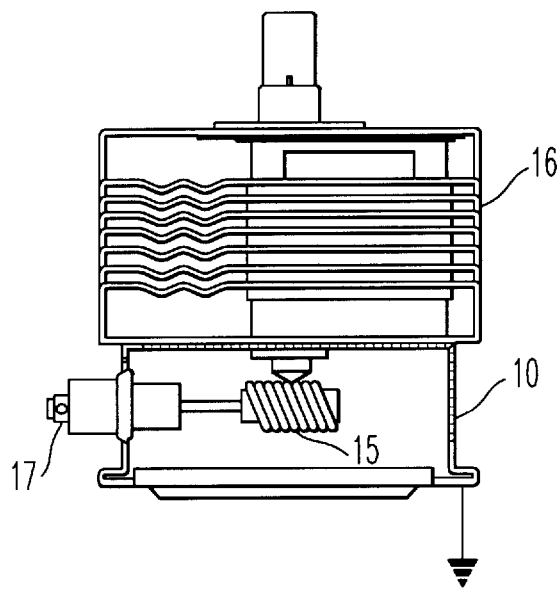
FIG. 3B is a sectional view of a magnetron provided with the feedthrough ceramic capacitor.
Figure 3C:
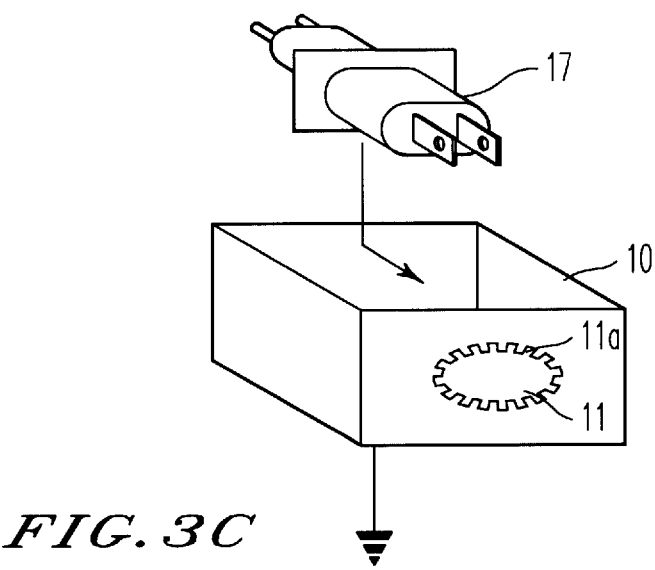
FIG. 3C is a conceptual view of the mounting of the feedthrough ceramic capacitor to a metal support.
Figure 4B:
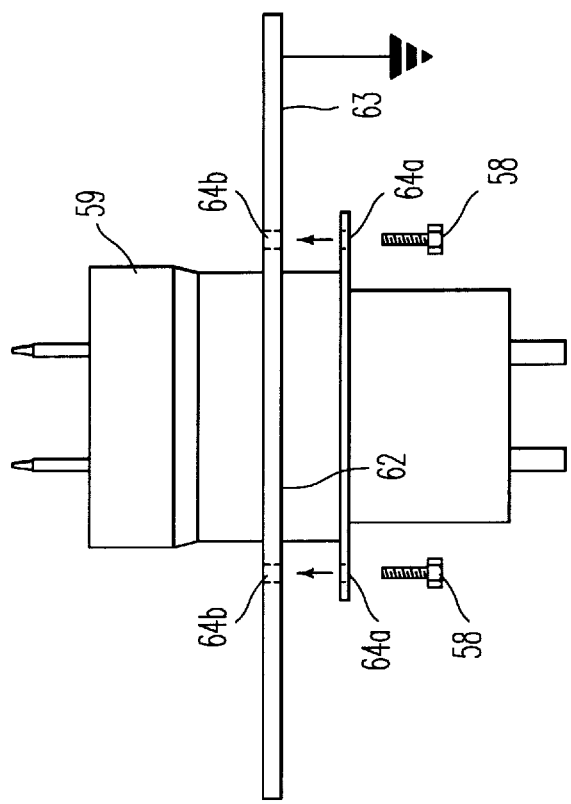
FIG. 4B is a sectional view showing a state of use thereof.
Figure 4A:
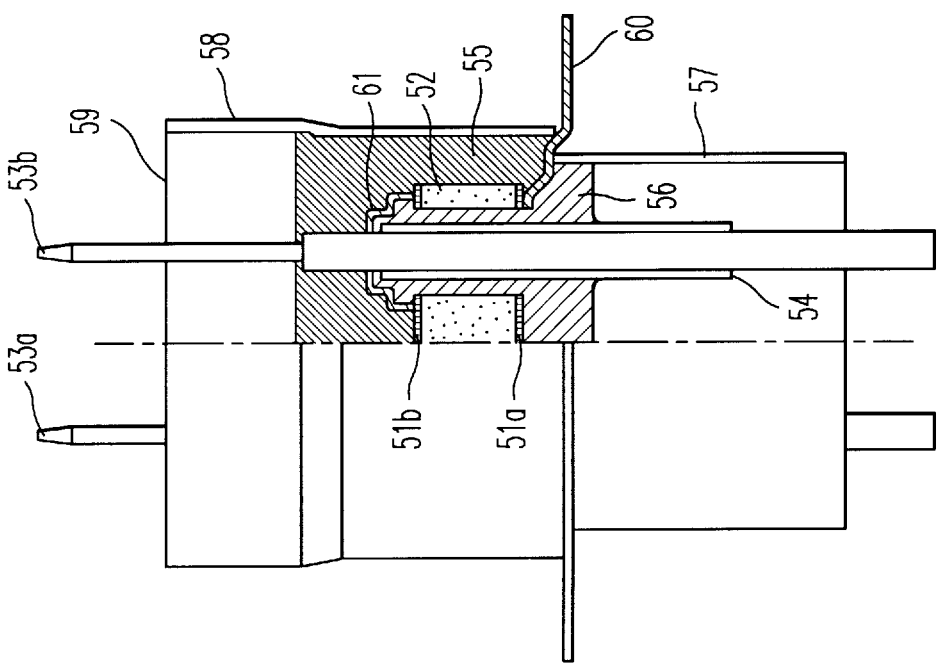
FIG. 4A is a partly sectional view of a conventional feedthrough ceramic capacitor.

When the feedthrough ceramic capacitor having the aforementioned configuration is provided, the feedthrough ceramic capacitor can be forced as shown in FIG. 3B into a filter box having the same configuration as the filter box 10 shown in FIG. 1B so as to be closely fixed thereto. The feedthrough ceramic capacitor of this embodiment is inserted from the inside as shown in FIG. 3C. Accordingly, both the improvement in workability and the prevention of high-frequency noise from leaking to the outside can be achieved.

Although description has been made about a feedthrough ceramic capacitor used in a high-frequency large-power apparatus such as a magnetron, or the like, which is apt to cause a problem of high-frequency noise, it is a matter of course that the present invention is not limited to a feedthrough ceramic capacitor used in such a high-frequency large-power apparatus but the present invention may be applied to any other feedthrough ceramic capacitor mounted to a support.

What is claimed is:

1. A feedthrough ceramic capacitor comprising:
   at least one capacitor having a first electrode and a second electrode;
   a grounding fitting connected to the first electrode of said capacitor;
   at least one feedthrough conductor connected to the second electrode of said capacitor and passed through said capacitor;
   a connection fitting connected to said feedthrough conductor; and
   an electrically insulating housing;
   wherein an exposed portion of said grounding fitting outside of said electrically insulating housing is substantially parallel to an outer surface of said electrically insulating housing, said exposed portion of said grounding fitting and said outer surface of said electrically insulating housing defining a cavity outside of said electrically insulating housing and inside of said exposed portion of said grounding fitting such that the grounding fitting is adapted to apply an elastic force to a capacitor support to frictionally fix the capacitor to the capacitor support.

2. A feedthrough ceramic capacitor according to claim 1, wherein a section of the exposed portion of said grounding fitting is perpendicular to said feedthrough conductor.

3. A feedthrough ceramic capacitor fixing method comprising the steps of:
   forcing a feedthrough ceramic capacitor into an insertion hole of a capacitor support;
   said feedthrough ceramic capacitor comprising: at least one capacitor having a first electrode and a second electrode; a grounding fitting connected to the first electrode of said capacitor; at least one feedthrough conductor connected to the second electrode of said capacitor and passed through said capacitor; a connection fitting connected to said feedthrough conductor; and an electrically insulating housing; wherein an exposed portion of said grounding fitting outside of said electrically insulating housing is substantially parallel to an outer surface of said electrically insulating housing, said exposed portion of said grounding fitting and said outer surface of said electrically insulating housing defining a cavity outside of said electrically insulating housing and inside of said exposed portion of said grounding fitting such that the grounding fitting is adapted to apply an elastic force to said capacitor support to frictionally fix the capacitor to the capacitor support;
   said capacitor support comprising: a metal support having said insertion hole for inserting the feedthrough ceramic capacitor therein, a corrugated edge being provided around an entire circumference of said insertion hole; and a ground potential; and
   keeping and fixing a grounding surface of said ground fitting of said feedthrough ceramic capacitor in a position such that the exposed portion of said grounding fitting is brought into contact with said capacitor support.

4. An LC composite part device comprising:
   a capacitor support;
   a feedthrough ceramic capacitor having a grounding fitting and an electrically insulating housing, an exposed portion of said grounding fitting outside of said electrically insulating housing being substantially parallel to an outer surface of said electrically insulating housing, said exposed portion of said grounding fitting and said outer surface of said electrically insulating housing defining a cavity outside of said electrically insulating housing and inside of said exposed portion of said grounding fitting such that the grounding fitting is adapted to apply an elastic force to said capacitor support to frictionally fix the capacitor to the capacitor support; and
   an inductor coupled to said feedthrough ceramic capacitor,
   wherein said exposed portion of said grounding fitting is in frictional contact with said capacitor support and fixes said feedthrough ceramic capacitor to said capacitor support.

5. A feedthrough ceramic capacitor according to claim 1, wherein said exposed portion of said grounding fitting and said outer surface of said electrically insulating housing are provided around an entire circumference of the feedthrough ceramic capacitor such that said cavity is defined around the entire circumference of the feedthrough ceramic capacitor.

6. An LC composite part device according to claim 4, wherein said exposed portion of said grounding fitting and said outer surface of said electrically insulating housing are provided around an entire circumference of the feedthrough ceramic capacitor such that said cavity is defined around the entire circumference of the feedthrough ceramic capacitor.

7. An LC composite part device according to claim 4, wherein a section of said exposed portion of said grounding fitting is perpendicular to said housing.

8. An LC composite part device according to claim 4, wherein said capacitor support comprises a corrugated edge that defines an insertion hole, said insertion hole being configured to receive said feedthrough ceramic capacitor.

* * * * *